United States Patent [19]  [11] 4,304,602
Wusirika  [45] Dec. 8, 1981

[54] MGO-CONTAINING OXYNITRIDE GLASSES AND GLASS-CERAMICS

[75] Inventor: Raja R. Wusirika, Painted Post, N.Y.

[73] Assignee: Corning Glass Works, Corning, N.Y.

[21] Appl. No.: 184,765

[22] Filed: Sep. 8, 1980

[51] Int. Cl.³ .......................... C03C 3/22; C03C 3/04
[52] U.S. Cl. ........................................... 501/2; 501/56
[58] Field of Search ................................. 106/39.6, 52

[56] References Cited

U.S. PATENT DOCUMENTS 3,582,307  1/1971  Mulfinger et al. .................... 65/134
4,186,021  1/1980  Chyung et al. ..................... 106/39.6

Primary Examiner—Earl C. Thomas
Assistant Examiner—Mark Bell
Attorney, Agent, or Firm—Kees van der Sterre

[57] ABSTRACT

Thermally crystallizable silicon oxynitride glasses containing substantial quantities of MgO, thermally crystallizable to fine-grained glass-ceramic products comprising forsterite, clinohumite and/or a beta-silicon nitride solid solution as the predominant crystal phase, are described.

1 Claim, 2 Drawing Figures

MGO-CONTAINING OXYNITRIDE GLASSES AND GLASS-CERAMICS

BACKGROUND OF THE INVENTION

The present invention relates to novel silicon oxynitride glass compositions containing substantial amounts of magnesium oxide, and to the production of glass-ceramic articles therefrom.

Predominantly oxide glasses and glass-ceramics containing structural nitrogen, that is nitrogen bound up in the structure of the glass or glass-ceramic rather than present merely as gaseous inclusions, are known. In U.S. Pat. No. 3,582,307 a procedure resulting in the incorporation of a small amount of nitrogen in an alkali boroaluminosilicate glass was described, that procedure involving bubbling nitrogen through the molten glass under controlled atmosphere conditions. In U.S. Pat. No. 4,186,021, and in related patents referred to therein, thermally crystallizable glasses containing substantial nitrogen concentrations are disclosed.

The glasses of the latter patent can be converted to glass-ceramics comprising such nitrogen-containing crystal phases as nitrogen-mullite ($Al_3Si_2O_7N$), silicon oxynitride ($Si_2ON_2$), and beta-silicon nitride ($\beta$-$Si_3N_4$) solid solution as well as crystal phases normally observed as silicates but in this case containing small amounts of structural nitrogen. Some of these nitrogen-containing crystal phases had previously been observed in the course of research into conventional nitride ceramics, but not in thermally crystallizable glasses.

U.S. Pat. No. 2,920,971 provides the earliest disclosure in the field of glass-ceramics. That patent describes the manufacture of a predominantly crystalline article (a glass-ceramic) through the heat treatment of a glass article fabricated from a thermally crystallizable glass. The crystallizable nature of the glass derives from the inclusion therein of a small amount of a nucleating agent which promotes crystal nucleation and growth in dense, homogeneous fashion throughout the volume of the glass during heat treatment.

Following this initial disclosure, the bulk of experimental work in the glass-ceramic field has involved the development of new thermally crystallizable glasses, formable into glass articles by conventional glass-forming techniques but thereafter crystallizable in situ by an appropriate heat treatment to glass-ceramics containing new crystal phases and exhibiting new properties. However, most of this work has been concentrated in oxide glass-forming systems.

SUMMARY OF THE INVENTION

The present invention is founded upon the discovery of a new glass-forming region in the $MgO$-$SiO_2$-$N$ composition field, containing bound nitrogen in the form $N^{-3}$ and MgO in proportions substantially in excess of those in which MgO can normally be incorporated into all-oxide glasses. The oxynitride glasses of the invention are thermally crystallizable, even in the absence of conventional nucleating agents such as $TiO_2$, $ZrO_2$ and $SnO_2$, and can provide glass-ceramics containing forsterite ($Mg_2SiO_4$), beta-silicon nitride solid solutions ($\beta$-$Si_3N_4$), or clinohumite ($MgF_2.4Mg_2SiO_4$) as predominant crystal phases.

The glass-forming region of the invention includes glasses consisting essentially, in parts by weight on the oxide basis as calculated from the batch based on a table of 100 parts by weight, of about 30–55 parts MgO, 45–75 parts $SiO_2$ and 4–8 parts N. The compositions may additionally include 0–15 parts $Al_2O_3$ and 0–7 parts F by weight as optional constituents. These glasses can be made from batch materials such as $SiO_2$, $Si_3N_4$, MgO, $Al_2O_3$, and $MgF_2$, and can be melted and formed using procedures such as employed in the prior art for preparing oxynitride glasses.

Conversion of glass articles within the above composition field to glass-ceramic articles can be accomplished utilizing heat treatments analogous to those conventionally employed for glass-ceramic manufacture. A suitable treatment comprises heating the glass article to a temperature in the crystal nucleation range for a time sufficient to achieve crystal nucleation (e.g. to 800° C. for 2 hours) and thereafter further heating the article to a temperature at which crystallization can be completed, typically 1000°–1200° C. for about 2 hours. In the present composition system, the development of clinohumite is promoted in compositions containing fluorine by moderate crystallization temperatures (e.g. 1000° C. for 2 hours), whereas the development of forsterite or $\beta$-$Si_3N_4$ solid solution phases is favored in fluorine-free compositions or at higher crystallization temperatures (e.g., 1200° C. for 2 hours).

The product of the thermal crystallization of a glass in accordance with the invention is a glass-ceramic article having a composition falling within the glass composition weight range above set forth, and having a predominant crystal phase selected from the group consisting of clinohumite ($MgF_2.4Mg_2SiO_4$), forsterite ($Mg_2SiO_4$) and beta-silicon nitride ($\beta$-$Si_3N_4$) solid solution. As is the case with more conventional glass-ceramic compositions, these glass-ceramic products are predominantly crystalline (having a crystal content in excess of 50% by volume), and exhibit a microstructure consisting of fine-grained, randomly oriented crystals homogeneously dispersed throughout a residual glassy matrix.

BRIEF DESCRIPTION OF THE DRAWING

The invention may be further understood by reference to the DRAWING, wherein.

DETAILED DESCRIPTION

Figure 1:
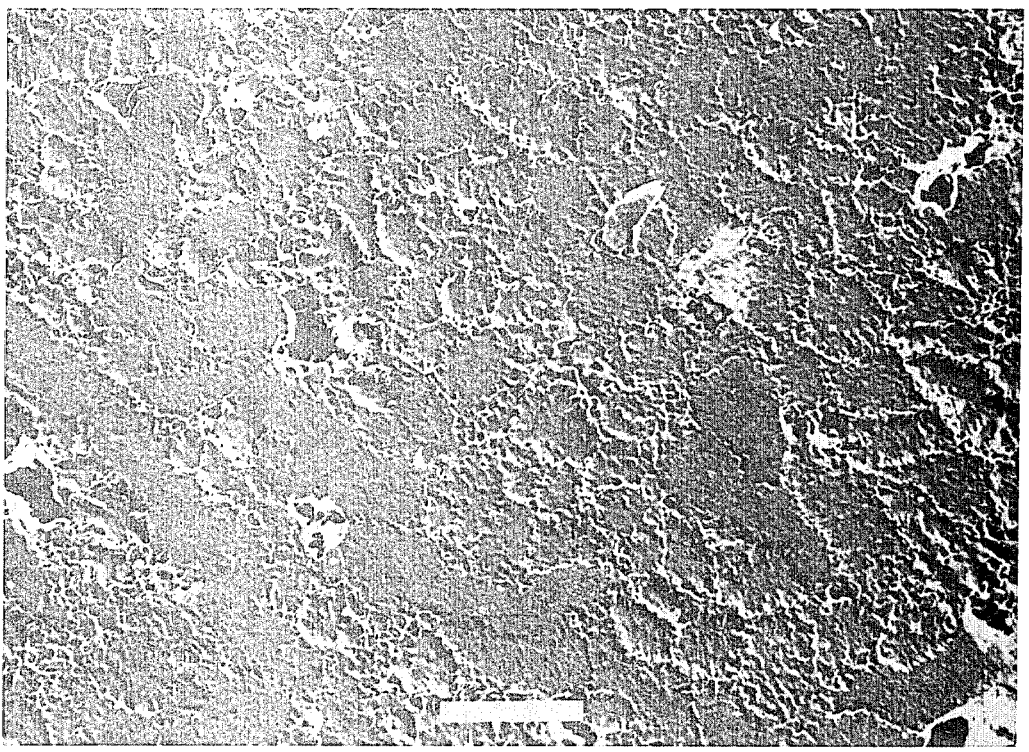
FIG. 1 is a photomicrograph illustrating the microstructure of a forsterite-containing glass-ceramic article provided in accordance with the invention.

Illustrative examples of specific glass compositions within the scope of the invention are set forth below in Table I. The compositions are reported in weight percent on the oxide basis as calculated from the batch, except of course for nitrogen and fluorine which are conventionally reported on an elemental basis since it is not known with which cations they are combined in the glass. The oxygen-fluorine and oxygen-nitrogen correction factors computed according to the practice conventional with glasses containing F or N are also given.

TABLE I

| | 1 | 2 | 3 | 4 | 5 | 6 | 7 | 8 | 9 | 10 |
|---|---|---|---|---|---|---|---|---|---|---|
| MgO | 43 | 45 | 50 | 41.2 | 43.2 | 45.2 | 46.5 | 52.5 | 36.0 | 32.0 |
| $Al_2O_3$ | 14 | 11 | 6 | 15 | 11 | 8 | 9 | — | — | — |
| $SiO_2$ | 47 | 48.3 | 48.3 | 47 | 48.3 | 48.3 | 48.3 | 48.3 | 66.9 | 73.7 |
| N | 5.6 | 6.0 | 6.0 | 5.6 | 6.0 | 6.0 | 6.0 | 6.0 | 4.1 | 8.0 |
| F | — | — | — | 3.0 | 3.0 | 4.9 | 6.1 | 6.1 | — | — |
| $O \cong N$ | −9.6 | −10.3 | −10.3 | −9.6 | −10.3 | −10.3 | −10.3 | −10.3 | −7.0 | −13.7 |
| $O \cong F$ | — | — | — | −1.2 | −1.2 | −2.1 | −2.6 | −2.6 | — | — |
| TOTAL | 100.0 | 100.0 | 100.0 | 100.0 | 100.0 | 100.0 | 100.0 | 100.0 | 100.0 | 100.0 |

As previously noted, glass batch constituents having known utility for the formulation of oxynitride glasses can be used in compounding batches for glasses in accordance with the present invention, such constituents including but not being limited to MgO, $Al_2O_3$, $SiO_2$, $Si_3N_4$, $MgF_2$ and the like. $Si_3N_4$ is the preferred source of nitrogen for these glasses, while $MgF_2$ is useful as a flux, helping to facilitate glass formation. Excessive additions of $Si_3N_4$ and $MgF_2$ can induce devitrification during forming, however, as can the inclusion in the glass of more than about 55% MgO. AlN is not a favored batch constituent because, even in minor proportions, it tends to promote devitrification of the glass to fosterite, spinel, and certain unidentified phases.

Volatilization of nitrogen and fluorine from these batches can occur during melting, being dependent upon the atmosphere and melting temperature utilized. Losses up to as much as 50% by weight can occur although, in general, such will run between about 10–40%.

Examples of batch formulations useful for producing the glass compositions of Table I above are reported in Table IA below. The batch compositions are reported in parts by weight.

TABLE IA

| | 1 | 2 | 3 | 4 | 5 | 6 | 7 | 8 | 9 | 10 |
|---|---|---|---|---|---|---|---|---|---|---|
| MgO | 43 | 45 | 50 | 38 | 40 | 40 | 40 | 46 | 36 | 32 |
| $Al_2O_3$ | 14 | 11 | 6 | 15 | 11 | 8 | 6 | — | — | — |
| $SiO_2$ | 29 | 29 | 29 | 29 | 29 | 29 | 29 | 29 | 53.7 | 48 |
| $Si_3N_4$ | 14 | 15 | 15 | 14 | 15 | 15 | 15 | 15 | 10.3 | 20 |
| $MgF_2$ | — | — | — | 5 | 5 | 8 | 10 | 10 | — | — |

Glasses of the compositions shown in Table I were produced from the batches shown in Table IA by melting under a substantially 100% nitrogen atmosphere. One-pound batches were ball-milled to assure homogeneity in the glass product, run into molybdenum crucibles, and melted in an induction furnace under nitrogen at a temperature of about 1650° C. for 4 hours. The melts were then poured into steel molds to form glass slabs, and the slabs were transferred to an annealer operating at 800° C.

Glass samples were cut from the annealed slabs for examination and for thermal treatment to provide glass-ceramic products. All of the glass samples were found to be substantially amorphous on examination by X-ray diffraction, although glasses 6–8 contained some crystalline inclusions or stones, attributed to the use of near-maximum concentrations of fluorine therein.

Table II below records heat treatments which were utilized to convert the glass samples of Tables I and IA into fine-grained glass-ceramic products. Included in Table II are temperatures and times for each of the nucleation and crystallization steps used to induce crystallization in situ in the samples, the lower temperature nucleation step being first reported. In all cases, the samples were heated to the nucleation temperatures and subsequently to the crystallization temperatures at a rate of 100° C./hr, and were cooled from the crystallization temperature at a furnace rate of about 3°–5° C./min.

Table II also reports the crystal phases identified in each of the glass-ceramic samples by X-ray diffraction analysis. It was noted that the X-ray diffraction pattern exhibited by samples containing beta-silicon nitride type crystals did not conform precisely to silicon nitride, although the degree of similarity was high. This phase appears to be promoted by the presence of fluorine in the composition, and is thought to contain oxygen and fluorine as well as silicon and nitrogen. Thus it is referred to herein as a solid solution of beta-silicon nitride.

TABLE II

| Sample No. | Heat Treatment | Crystal Phases |
|---|---|---|
| 1 | 800° C. for 2 hours | forsterite + |
|   | 1000° C. for 2 hours | unidentified phases |
| 1 | 800° C. for 2 hours | forsterite |
|   | 1200° C. for 2 hours | |
| 2 | 800° C. for 2 hours | forsterite + |
|   | 1000° C. for 2 hours | unidentified phases |
| 2 | 800° C. for 2 hours | forsterite |
|   | 1200° C. for 2 hours | |
| 3 | 800° C. for hours | forsterite + |
|   | 1000° C. for 2 hours | unidentified phases |
| 3 | 800° C. for 2 hours | forsterite |
|   | 1200° C. for 2 hours | |
| 4 | 800° C. for 2 hours | forsterite + beta- |
|   | 1000° C. for 2 hours | silicon nitride phase |
| 5 | 800° C. for 2 hours | forsterite + beta- |
|   | 1000° C. for 2 hours | silicon nitride phase |
| 5 | 800° C. for 2 hours | forsterite + beta- |
|   | 1200° C. for 2 hours | silicon nitride phase |
| 6 | 800° C. for 2 hours | forsterite + beta- |
|   | 1000° C. for 2 hours | silicon nitride phase |
| 7 | 800° C. for 2 hours | clinohumite |
|   | 1000° C. for 2 hours | |
| 7 | 800° C. for 2 hours | forsterite + |
|   | 1200° C. for 2 hours | unidentified phases |
| 8 | 800° C. for 2 hours | clinohumite |
|   | 1000° C. for 2 hours | |
| 8 | 800° C. for 2 hours | forsterite + |
|   | 1200° C. for 2 hours | unidentified phases |
| 9 | 800° C. for 2 hours | forsterite |
|   | 1200° C. for 2 hours | |
| 10 | 800° C. for 2 hours | forsterite |
|   | 1200° C. for 2 hours | |

The fine-grained crystalline microstructure of the forsterite glass-ceramics provided in accordance with the invention is illustrated in FIG. 1 of the drawing, which is a photomicrograph of composition 1 of Table I, heat-treated according to the 1200° C. crystallization schedule reported in Table II. The white bar in the figure represents a dimension of one micron.

Figure 2:
FIG. 2 is a photomicrograph illustrating the microstructure of a forsterite/beta-silicon nitride glass-ceramic article provided in accordance with the invention.

The microstructure of a forsterite/beta-silicon nitride glass-ceramic provided in accordance with the invention is shown in FIG. 2 of the drawing, which is a photomicrograph of composition 5 of Table I, heat treated in accordance with the 1200° C. crystallization schedule reported in Table II. The white bar in FIG. 2 again represents a dimension of one micron.

Physical properties were determined on the forsterite-containing glass-ceramic product of FIG. 1, that glass-ceramic having a density of 3.04 grams/cm$^3$ and an average thermal expansion coefficient over the temperature range from room temperature to 800° C. of about $86 \times 10^{-7}$/°C. The Young's modulus of the material was $27 \times 10^6$ psi, the shear modulus was $11 \times 10^6$ psi, and the Knoop hardness was 900.

The glasses and glass-ceramics of the invention are of particular interest because of the extreme difficulty of producing glasses thermally crystallizable to forsterite-containing glass-ceramics. The crystallization behavior of these glasses is particularly unexpected when it is recognized that their compositions are actually closer to that of enstatite ($MgSiO_3$) than to forsterite.

The introduction of the high quantities of magnesia necessary for forsterite development into an all-oxide glass system is difficult because it results in very unstable glasses. Thus the oxide analog of composition Example 1 of Table I, having an oxide composition, by weight, of about 41.3% MgO, 13.8% $Al_2O_3$, and 45.2% $SiO_2$, could not be formed into a good glass but instead exhibited spontaneous devitrification to coarse grained forsterite when forming was attempted. Similarly, the oxide equivalent of composition Example 9, consisting of about 35% MgO and 65% $SiO_2$ by weight, failed to exhibit any glass formation whatever upon casting into a steel mold. These results demonstrate the importance of nitrogen in enhancing glass formation in the present composition system.

I claim:

1. A batch composition for a thermally crystallizable $MgO$-$SiO_2$-N glass, said glass being thermally crystallizable to a fine-grained glass-ceramic product comprising forsterite, clinohumite and/or beta-silicon nitride solid solution as the predominant crystal phase, said composition consisting essentially, in parts by weight on the oxide basis, based on a total of 100 parts by weight, of about 30-55 parts MgO, 45-75 parts $SiO_2$, 4-8 parts N, 0-15 parts $Al_2O_3$ and 0-7 parts F.

* * * * *